US010147559B2

(12) United States Patent
Le Gal

(10) Patent No.: US 10,147,559 B2
(45) Date of Patent: Dec. 4, 2018

(54) DEVICE FOR SEPARATING AT LEAST TWO ADJACENT STRANDS OF MATERIAL AND SYSTEM INCLUDING SUCH A DEVICE

(71) Applicant: BLUE SOLUTIONS, Ergue Gaberic (FR)

(72) Inventor: Guy Le Gal, Quimper (FR)

(73) Assignee: BLUE SOLUTIONS, Ergue Gaberic (FR)

(*) Notice: Subject to any disclaimer, the term of this patent is extended or adjusted under 35 U.S.C. 154(b) by 292 days.

(21) Appl. No.: 14/783,053

(22) PCT Filed: Apr. 9, 2014

(86) PCT No.: PCT/EP2014/057104
§ 371 (c)(1),
(2) Date: Oct. 7, 2015

(87) PCT Pub. No.: WO2014/166973
PCT Pub. Date: Oct. 16, 2014

(65) Prior Publication Data
US 2016/0071659 A1 Mar. 10, 2016

(30) Foreign Application Priority Data
Apr. 9, 2013 (FR) ...................................... 13 53166

(51) Int. Cl.
H01G 13/00 (2013.01)
H01G 11/84 (2013.01)
(Continued)

(52) U.S. Cl.
CPC ......... H01G 13/006 (2013.01); B65H 23/038 (2013.01); B65H 57/16 (2013.01);
(Continued)

(58) Field of Classification Search
CPC ...... B65H 57/16; H01G 11/84; H01G 13/006; H01M 10/0404
See application file for complete search history.

(56) References Cited

U.S. PATENT DOCUMENTS 4,960,234 A * 10/1990 Focke .................... B65B 41/12
226/15
5,300,184 A * 4/1994 Masunaga ................ B30B 3/04
100/155 G (Continued)

FOREIGN PATENT DOCUMENTS

| CN | 102530622 A | 7/2012 |
| CN | 102951494 A | 3/2013 |
| EP | 0 309 818 A2 | 4/1989 |

OTHER PUBLICATIONS

French Search Report dated Jan. 3, 2014, 4 pages.

Primary Examiner — Mark A Osele
Assistant Examiner — Christopher C Caillouet
(74) Attorney, Agent, or Firm — Womble Bond Dickinson (US) LLP

(57) ABSTRACT

The invention relates to a device (30) for separating at least two strands of material (12a, 12b) from the cutting of a strip of material moving continuously, characterized in that the device includes a spreader (32, 33) for spreading the strands of material apart in a transverse direction (v) extending in the movement plane (P2) of the strands of material, perpendicularly to the movement direction of said strands of material.

15 Claims, 7 Drawing Sheets

Figure 1:
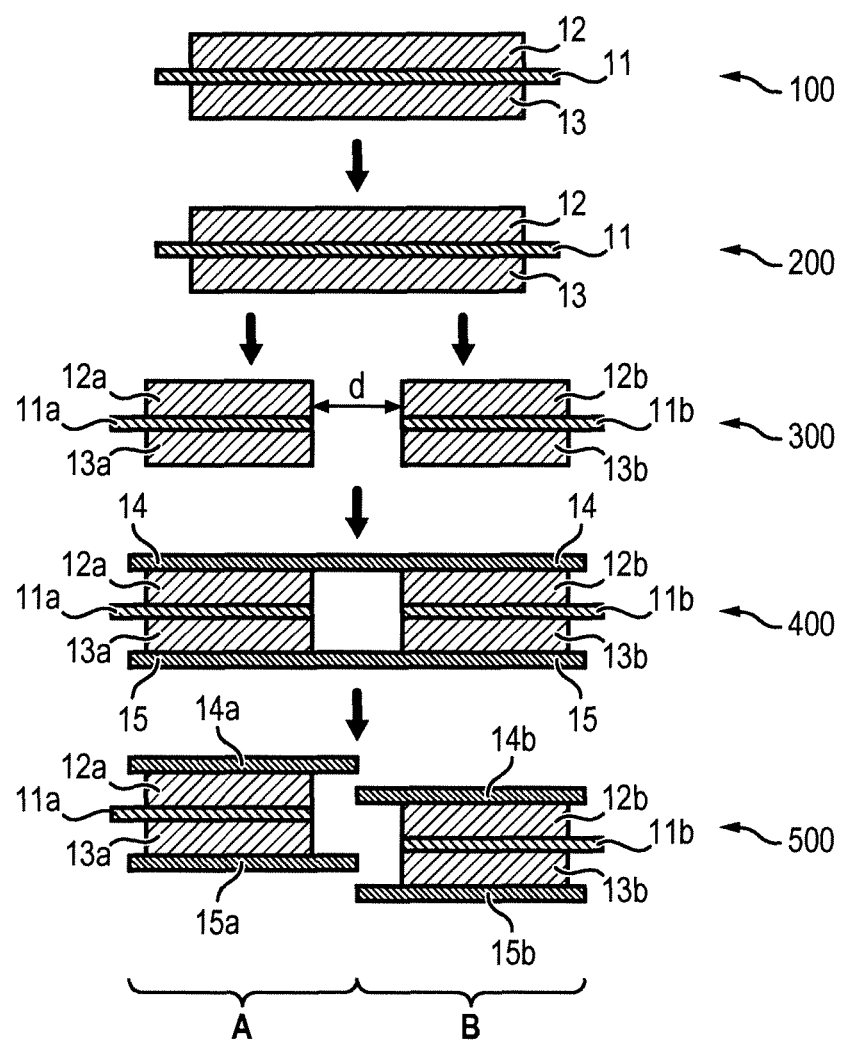

(51) Int. Cl.
*H01M 10/04* (2006.01)
*B65H 57/16* (2006.01)
*B65H 23/038* (2006.01)
*H01G 4/32* (2006.01)
*H01G 13/02* (2006.01)
*H01M 4/04* (2006.01)

(52) U.S. Cl.
CPC ............... *H01G 4/32* (2013.01); *H01G 11/84* (2013.01); *H01G 13/02* (2013.01); *H01M 4/04* (2013.01); *H01M 10/0404* (2013.01); *B65H 2301/351* (2013.01); *B65H 2301/4148* (2013.01); *B65H 2404/1523* (2013.01); *B65H 2404/15212* (2013.01); *B65H 2801/72* (2013.01); *Y02E 60/13* (2013.01)

(56) References Cited

U.S. PATENT DOCUMENTS

| | | |
|---|---|---|
| 2010/0181007 A1 | 7/2010 | Yamamoto |
| 2011/0131799 A1* | 6/2011 | Ito .......................... H01M 4/04 29/623.1 |
| 2013/0037647 A1 | 2/2013 | Gorke |

* cited by examiner

DEVICE FOR SEPARATING AT LEAST TWO ADJACENT STRANDS OF MATERIAL AND SYSTEM INCLUDING SUCH A DEVICE

TECHNICAL FIELD

The present invention relates to the general technical field of the production of ribbons of electrical energy storage complex for the production of electrical energy storage units.

In the context of the present invention, the term "electrical energy storage unit" is understood to mean either a capacitor (i.e. a passive system comprising two electrodes and an insulator), a supercapacitor (i.e. a system comprising at least two electrodes, an electrolyte and at least one spacer), or a battery of lithium type (i.e. a system comprising at least one anode, at least one cathode and an electrolyte solution between the anode and the cathode).

GENERAL OVERVIEW OF THE PRIOR ART

Systems and methods for producing a ribbon of electrical energy storage complex are known. Such a ribbon is then used to make an energy storage unit, such as a lithium battery for example.

These systems and methods make it possible to produce a ribbon of complex by assembly:
- of a reel of film known as the "collector/cathode" containing a layer of collector between two layers of cathode, and
- of two reels of film known as "electrolyte" each containing a layer of electrolyte.

To speed up the rate of production of the collector/cathode film reels and the electrolyte film reels, the width of each of these films is generally around "n" times greater—n being a non-zero integer—than the width of the ribbon of electrical energy storage complex that is finally desired to obtain.

It is therefore necessary to longitudinally cut the reel of collector/cathode film and the reels of electrolyte film to the same width as that desired of the ribbon of storage complex. This cutting of the different films is produced prior to their assembly.

This cutting step has the drawback of requiring personnel and many handlings of reels, which is expensive in time and resources and reduces output.

One aim of the present invention is to propose a device for separating at least two strands of material making it possible to palliate at least one of the aforementioned drawbacks. Another aim of the invention is to propose a system for producing a ribbon of electrical energy storage complex comprising such a separating device.

PRESENTATION OF THE INVENTION

For this purpose, the invention proposes a device for separating at least two strands of material created by longitudinally cutting a continuously moving strip of material, noteworthy in that the device comprises:
- upstream guiding means of the two strands of material, guiding them along one and the same direction, known as the main direction,
- a spacer to space the strands of material along a direction extending in the moving plane of the strands of material, the spacer including guiding means configured to guide the strands of material along two separate and divergent directions in said moving plane,
- two downstream guiding means of the two separated strands of material, guiding them along one and the same direction, wherein the upstream guiding means and the spacer are positioned so that the moving plane of the strands of material in the spacer forms a non-zero angle with the moving plane of the strands of material between the upstream guiding means and the spacer, wherein the spacer and the downstream guiding means are positioned so that the moving plane of the strands of material in the spacer forms a non-zero angle with the moving plane of the strands of material between the spacer and the downstream guiding means.

The strands of material to be separated extend longitudinally. They are obtained by cutting a strip of continuously moving material.

The separating device presented above makes it possible to space two strands of material while keeping them in one and the same moving plane, which has the advantage of making it possible to assemble these spaced strands with other films such as a film or film(s) of electrolyte.

The fact of guiding the two strands of material in two divergent directions makes it possible to space the first and second strands apart from one another.

The downstream guiding means make it possible to reorient the strands of material so that they move along parallel moving directions, thus keeping constant the distance separating the strands of material spaced apart by the spacer, particularly in order to be able to superimpose one and the same layer on the separated strands of material.

In addition, owing to the angle between the different moving planes, a torsion in the strands is generated which is slight but far less likely to generate a tear than the stresses generated by a separation without changing moving plane.

Owing to the invention, it is possible to then assemble the electrolyte film with the cathode film so that the electrolyte film extends past the edges of the cathode film. In this way optimal insulation is ensured between the anode (which will be added to the stack subsequently) and the cathode, avoiding any risk of contact between these two electrodes.

In some embodiments, only one of the two strands of material is guided into the spacer along a different direction from the main direction. In other embodiments, the two strands of material are guided into the spacer along a different direction from the main direction so as to space them apart from one another. The fact that the two strands of material are separated from the main direction makes it possible to obtain symmetry of operation of the separating device so that each strand of material undergoes the same mechanical stresses, fewer than the stresses undergone for the same separation of one of the two strands if it alone had been diverted from the main direction.

Preferred but non-limiting aspects of the method according to the invention are as follows:
- The spacer comprises at least two adjacent support parts, each support part including separating guiding means to guide one of the strands of material;
- the separating guiding means of each support part comprise at least two successive cylinders with parallel axes, rotationally movable about their axes, the axes of rotation of the two cylinders belonging to two separate support parts forming a non-zero angle;
- the use of the cylinders allows a distribution of all the forces tending to pivot the strands of material over its whole width;
- each of the support parts comprises an arm connecting the successive cylinders of the support part together and keeping their axes mutually parallel, at least one of the arms being able to pivot in relation to the other of the arms along a direction basically normal to the moving plane of the strands of material;

It is then possible to adjust the position of the arms in relation to each other easily. Moreover, when starting the separating device, it is possible to avoid breaking the strip of material since the orientation or the arm(s) is modified little by little, in order to avoid suddenly generating excessive stresses in the strip of material;

at least two adjacent cylinders belonging to separate support parts are in contact at one of their ends;

this makes it possible, firstly to limit the bulk of the device, and secondly to avoid deterioration of the strands of material at their facing edge (or central edge);

pre-stressed elastic means are located between one of the ends of a guiding cylinder and the arm carrying this cylinder to repel said cylinder toward the adjacent cylinder belonging to another support part;

this makes it possible to put the bases, or ends of all the cylinders in contact with one another, whatever the distance that separates them and the adjustment of the position of the arms if the latter is intended to be variable;

the downstream guiding means comprise at least one moving cylinder rotationally movable about its axis, the moving cylinder(s) being suitable for receiving the strands of material spaced apart by the spacer;

the length of the moving cylinder is in particular greater than or equal to the sum of the widths of the spaced strands of material and the distance(s) between these spaced strands of material, which allows the moving cylinder to be wide enough to receive all the strands of material separated by the spacer;

in a variant, the downstream guiding means could comprise more than one moving cylinder;

the upstream guiding means comprise at least one moving cylinder rotationally movable about its axis, suitable for receiving the strands of material cut longitudinally and located side by side;

the length of the moving cylinder is in particular greater than or equal to the sum of the widths of the cut strands of material (i.e. the width of the strip of material);

the separating guiding cylinders can be coupled to at least one motor to drive the strands of material;

this could be the case for the moving cylinders and more generally of all the cylinders of the separating device. This is however optional, as the strands can be driven downstream of the system comprising the separating device:

the use of a motor makes it possible to generate the traction forces inducing the moving of the strands of material;

the upstream guiding means and the spacer are positioned so that the moving plane of the strands of material in the spacer is basically perpendicular to the moving plane of the strands of material between the upstream guiding means and the spacer, and/or the spacer and the downstream guiding means are positioned so that the moving plane of the strands of material in the spacer is basically perpendicular to the moving plane of the strands of material between the spacer and the downstream guiding means;

this then reduces the bulk of the device as well as the stresses generated on the strands of material when they change angle (upstream and downstream of the spacer);

the downstream guiding means are configured to guide the strands of material along the main direction, the guiding means of the spacer being configured to guide at least one of the strands of material, particularly the two strands, along a direction separate from the main direction.

The invention also relates to a system for producing a ribbon of electrical energy storage complex including at least one strand of material, characterized in that the production system comprises a separating device as described above to space the at least two strands of material apart from one another.

In the context of the present invention, the term "complex" is understood to mean a stack including at least two separate layers, in particular a layer of cathode and a layer of electrolyte.

Preferred but non-limiting aspects of the system according to the invention are as follows:

The system further comprises a measuring device, downstream of the separating device, to measure the traction forces exerted on each strand of material; this makes it possible to control the traction forces exerted by the system on the strands of material in order to induce their moving;

the system further comprises a complexing device, downstream of the separating device, to assemble at least one film in a single piece, such as an electrolyte film, on the spaced strands of material;

the complexing device comprises pressing means for superimposing and assembling said or at least one of the films on one of the faces of the spaced strands of material;

the pressing means comprise a support and at least one compressing cylinder allowing the driving of the spaced strands of material, the spaced strands of material and the film(s) moving between the support and said and at least one compressing cylinder;

the support comprises at least one support cylinder facing said and at least one compressing cylinder;

the pressing means further comprise balancing means to vary the inclination of the axis of rotation of the compressing cylinder in relation to the support; in a variant, the pressing means can comprise balancing means to vary the inclination of the support in relation to the axis of rotation of the compressing cylinder, preferably as a function of the results returned by the measuring device;

this makes it possible to vary the drive speeds induced by the cylinders on the strands of material, particularly as a function of the data output by the measuring device, in order to keep these traction forces equal with one another;

the system also comprises a heating element for heating the strands of material of said or at least one of the films superimposed on the strands of material;

the use of a heating element makes it possible to improve the quality of the bonding between the film and the strands of material.

PRESENTATION OF THE FIGURES

Figure 2:
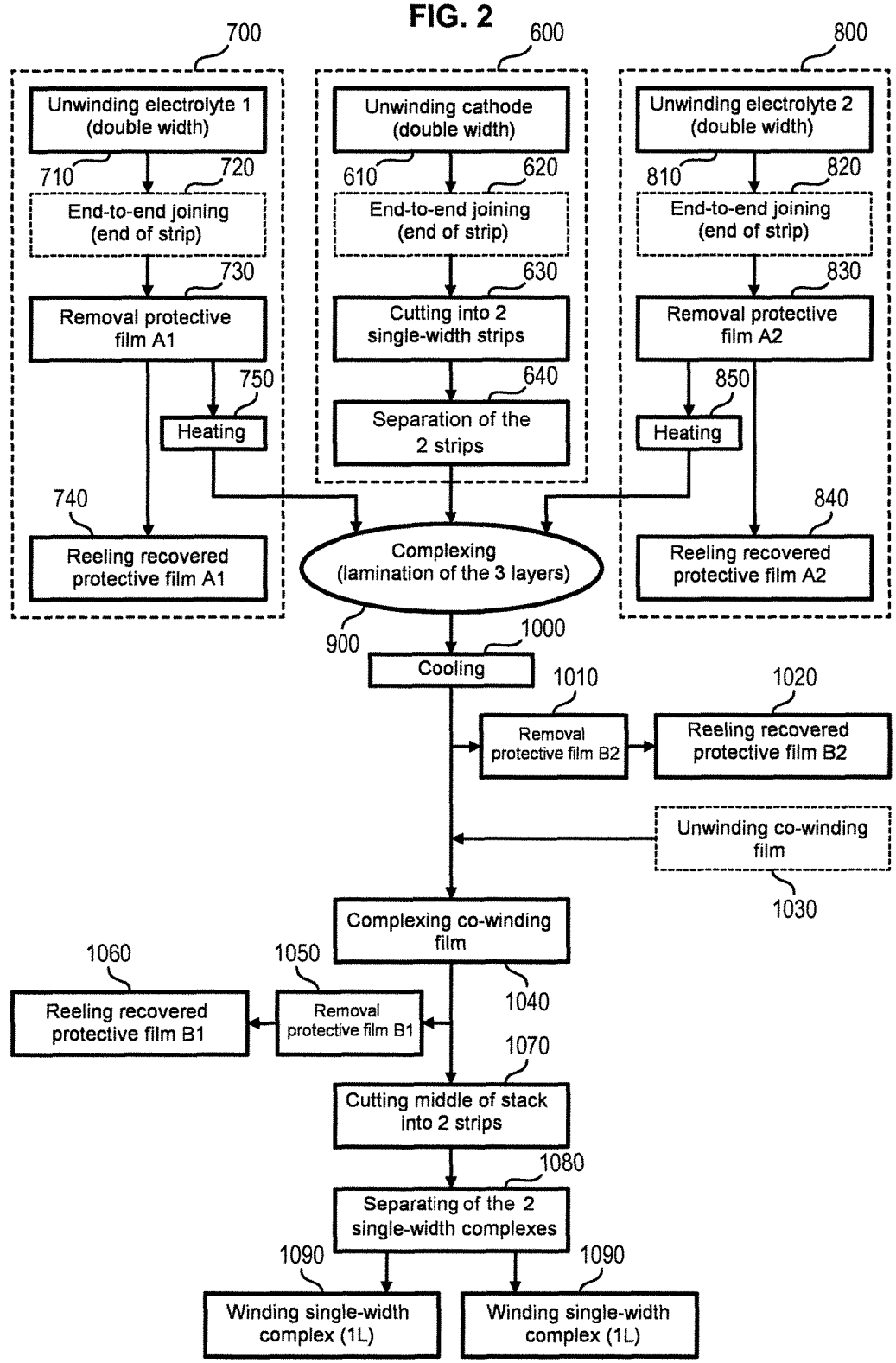
Figure 3:
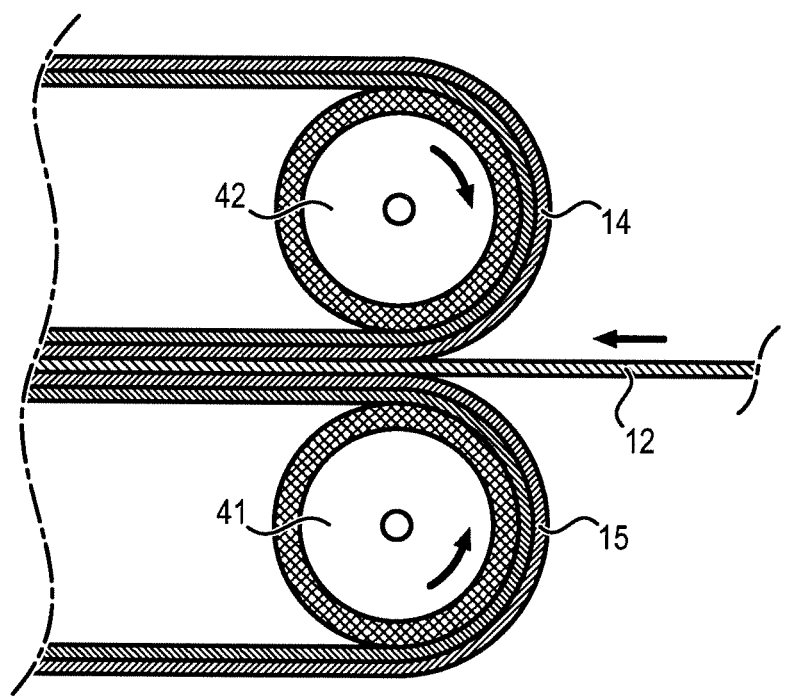
Figure 4:
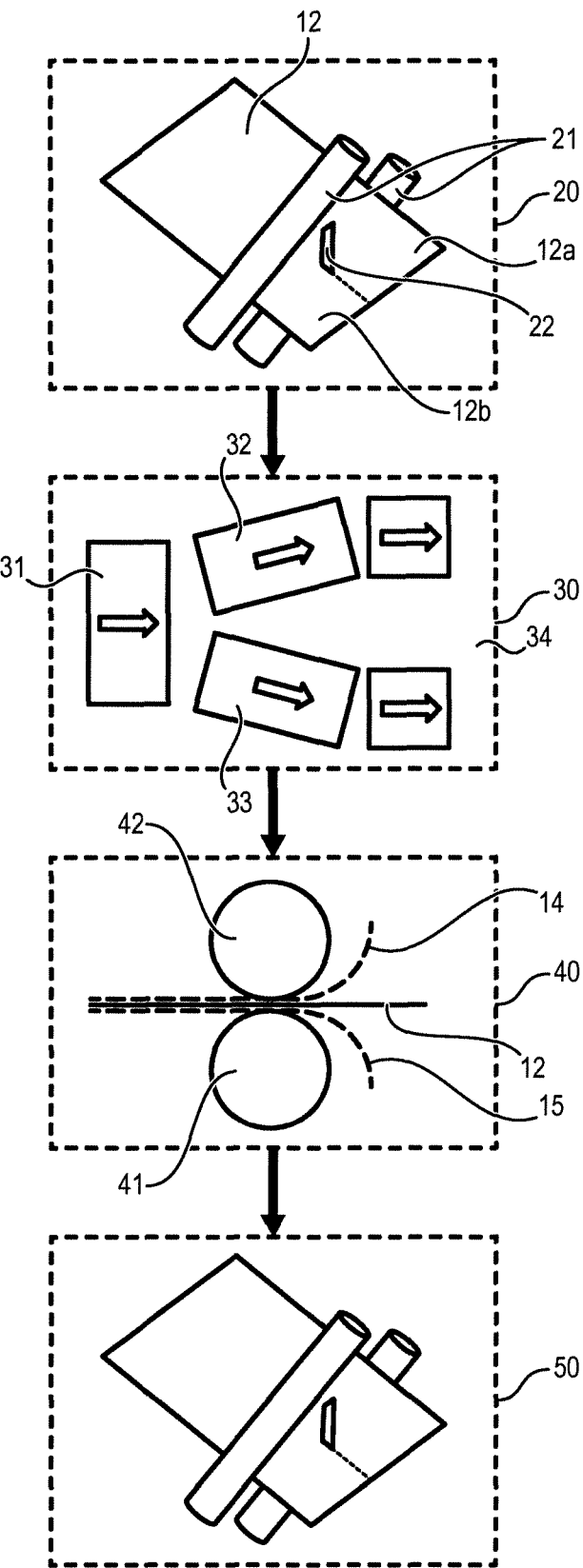
Figure 5A:
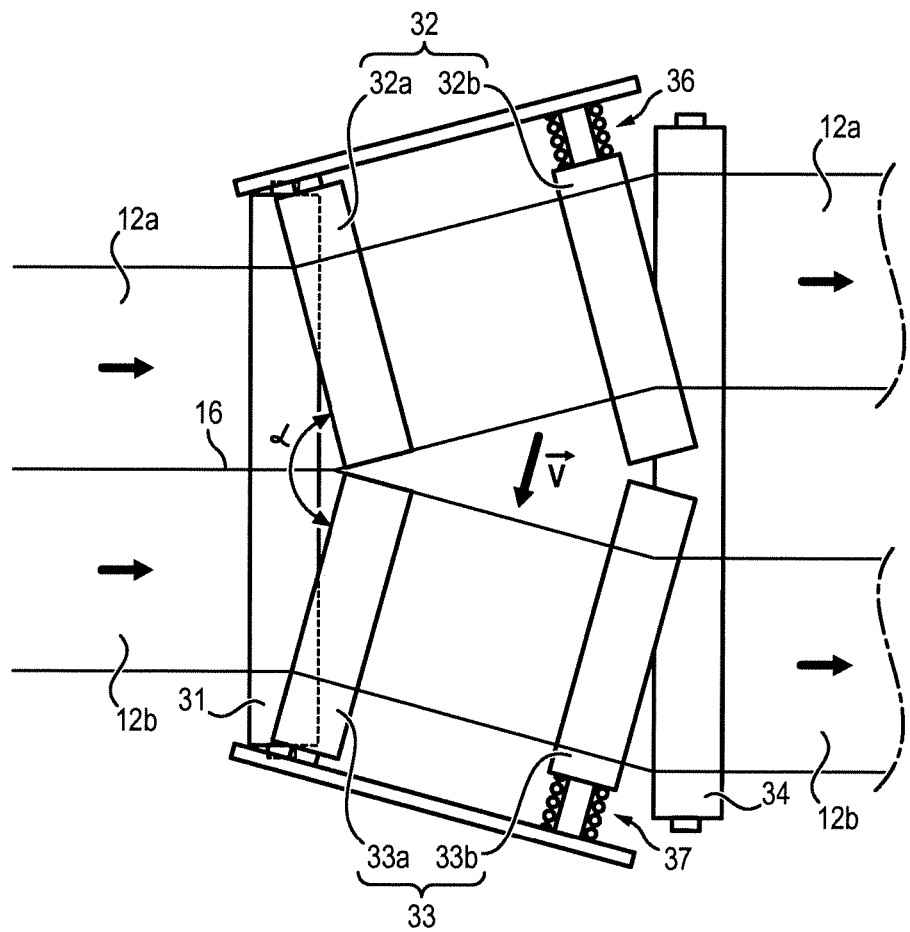
Figure 5B:
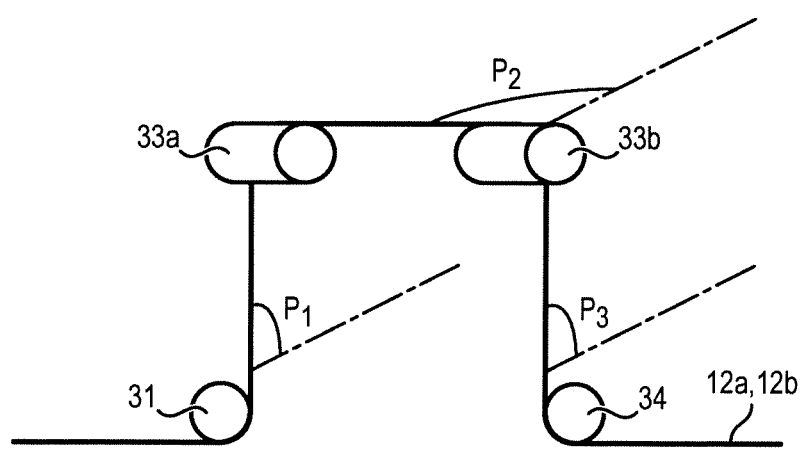
Figure 6:
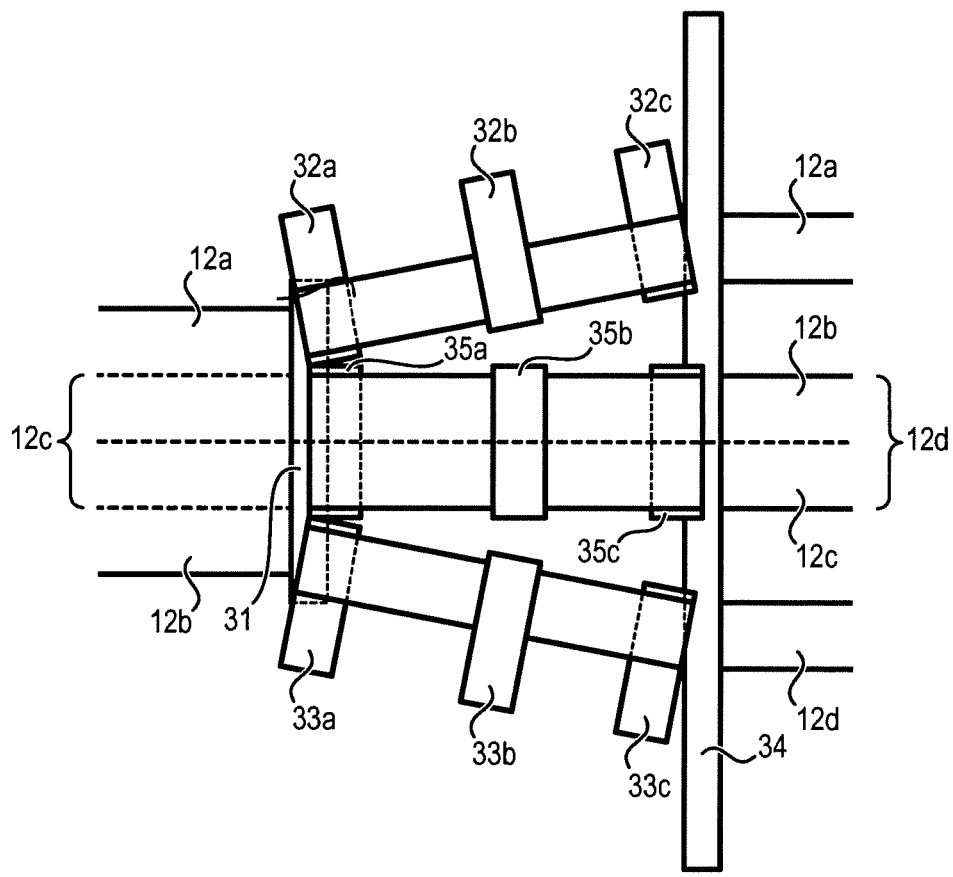
Figure 7:
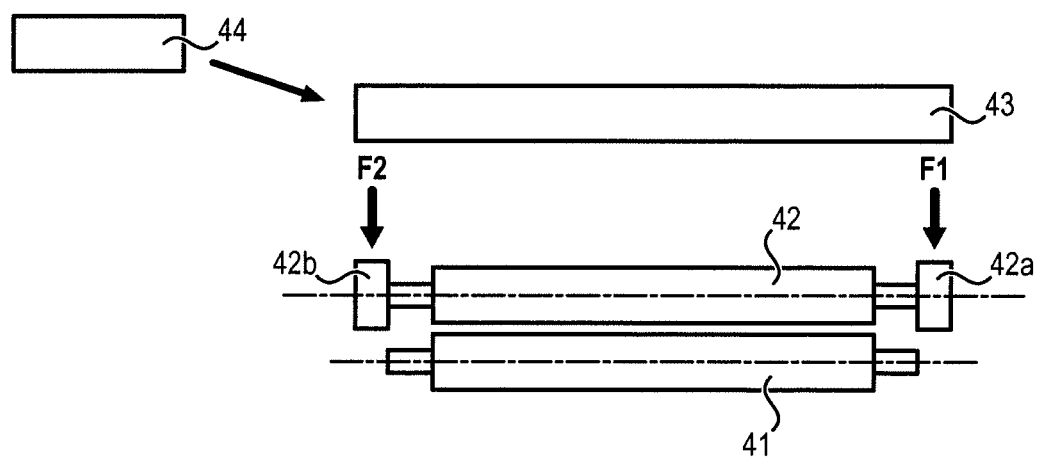
Figure 8:
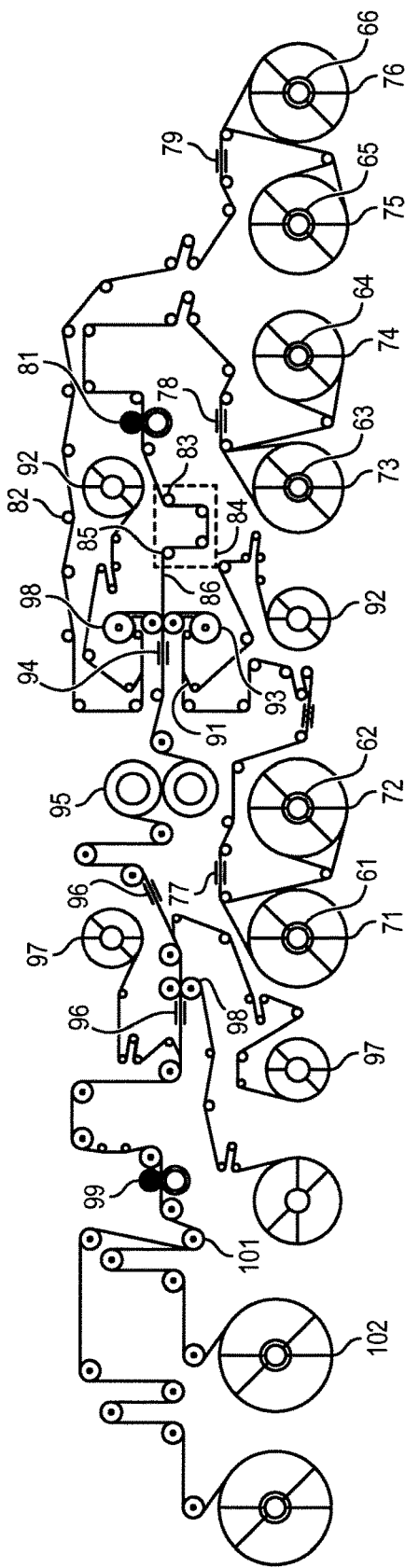

Other features, aims and advantages of the present invention will furthermore become apparent from the following description, which is purely illustrative and non-limiting and must be read with reference to the appended drawings wherein:

FIGS. 1 and 2 illustrate embodiments of a method for producing a ribbon of electrical energy storage complex, FIG. 3 illustrates a complexing device, FIGS. 4 and 8 illustrate embodiments of a system for producing a ribbon of electrical energy storage complex, FIGS. 5 and 6 illustrate a separating device, FIG. 7 illustrates compressing cylinders of a complexing device.

DESCRIPTION OF THE INVENTION

Various embodiments of the invention will now be described with reference to the figures. In these various figures, equivalent elements bear the same reference numbers.

1. Production Method 1.1. General Principle

With reference to FIG. 1, the main steps of a method for producing a ribbon of electrical energy storage complex are illustrated.

A ribbon of electrical energy storage complex can be all or part of the element that will enable energy storage. In the embodiments described below, for example, the electrolyte and the cathode of a battery are assembled, the anode being added in a following step, using another device. It could however be possible to produce the energy storage element in its entirety using the method and device described above.

Once obtained, this ribbon can be used for producing electrical energy storage units containing a portion of this ribbon—optionally wound or folded, placed in a housing of a watertight protective jacket of said storage unit.

1.1.1. Moving Step

The method for producing the ribbon comprises a step 100 consisting of continuous moving a strip of material 11, 12, 13. This strip of material 11, 12, 13 is preferably stored in the form of a roll. It can for example be composed either:
  of a cathode film 12,
  of cathode film 12 superimposed on a collector film 11, or
  of a stack composed of a collector film 11 extending between two cathode films 12, 13.

In the example illustrated in FIG. 1, the strip of material includes a stack composed:
  of a first cathode film 13,
  of a collector film 11 on the first cathode film 13 and
  of a second cathode film 12 on the collector film 11.

1.1.2. Cutting Step

In another step 200 of the method, the continuously moving strip of material is cut longitudinally. This makes it possible to obtain two strands of material (11a, 12a, 13a and 11b, 12b, 13b) from the initial strip of material.

The cutting of the strip of material is for example implemented in a cutting device that will be described in more detail further on.

This cutting can be carried out in the middle of the strip of material so as to obtain two strands of material of same width. In a variant, the cutting can be offset with respect to the middle of the strip so as to obtain two strands of material of different widths.

Of course, the strip of material can be cut into several regions over its width (for example three regions) so as to obtain a plurality of strands of material (for example four strands of material).

1.1.3. Separating Step

The method also comprises a step 300 consisting in separating the strands of material driven in parallel. More precisely, the strands of material 11a, 12a, 13a and 11b, 12b, 13b are separated from one another along a direction of separation extending in a moving plane of the strands of material.

Following the separating step, explained in detail below, two strands of material 11a, 12a, 13a and 11b, 12b, 13b are obtained, spaced transversally apart from one another by a distance d.

Preferably, these strands of material, once separated, extend in one and the same plane.

1.1.4. Complex Forming Step

One (or several) electrolyte layer(s) 14, 15 is (or are) formed or applied on the separated strands of material (step 400). A complex is thus obtained.

In certain variant embodiments, an electrolyte layer 14 is formed on a single face of the separated strands of material.

In the embodiment illustrated in FIG. 1, a respective electrolyte layer 14, 15 is formed on each of the faces of the separated strands of material.

The electrolyte layer(s) 14, 15 can be formed by any technique known to the person skilled in the art.

For example, the electrolyte layer can be formed by depositing at least one electrolyte film on the two strands of material driven in parallel (i.e. simultaneously and synchronously) so that the electrolyte film covers the whole surface of each of the strands of material.

In this case, the width of the electrolyte film partly covers the opposite ends of the two separated strands of material without coming into contact with the collector film so as to avoid the risks of short-circuit, but leaving a sufficient portion of collector accessible to make it possible to electrically connect the cathode.

1.1.5. Complex Cutting Step

Once the electrolyte layer(s) have been formed, the complex is cut longitudinally (step 500) to obtain the two ribbons of electrical energy storage complex which will subsequently be used by being placed in energy storage elements.

This cutting step can be implemented using a cutting device similar to that used to cut the strip of material longitudinally.

In the example illustrated in FIG. 1, in this way two ribbons of complex of single width are obtained from film reels of double width.

1.2. Example of a Production Method

With reference to FIG. 2, an example is illustrated of a production method for obtaining two ribbons of single width from a strip of material and electrolyte films of double width. This method can be implemented using a production system that will be described with reference to 3 to 8.

The method comprises three phases 600, 700, 800 of preparation prior to the assembly of the strip of material with the electrolyte films:
  a phase 600 of preparing the strip of material, and
  two phases 700, 800 of preparing the electrolyte films.

This three preparation phases and be implemented in parallel in order to reduce the production time of the ribbon of electrical energy storage complex.

1.2.1. Preparation of the Strip of Material

The phase 600 of preparing the strip of material comprises a step 610 consisting in moving the strip of material continuously. This moving step 610 can for example be obtained by unwinding the strip of material from a rotating reel.

Advantageously, the preparation phase can comprise an optional step of end-to-end joining 620 using a joining device known to the person skilled in the art. The joining step makes it possible to attach:
  the so-called "strip beginning" end of a reel, to the so-called "strip end" of another reel already unwound and used in the method.

This makes it possible to change the reels of the strips of material without requiring any prolonged interruption of the production system associated with the method.

The preparing phase also comprises a step 630 of cutting the strip of material longitudinally so as to obtain strands of material, particularly two strands of material, of single width from a strip of double width. This step is implemented in a cutting device: the strip of material moves past the cutting device which divides it into two strands of material.

The preparation phase also comprises a step 640 of separating the strands of material obtained at the output of the cutting device. The strands of material move until they reach a separating device. This separating device spaces the strands of material along a transversal direction. This transversal direction extends in the moving plane of the strands of material, perpendicularly to their moving direction. The separating device for carrying out this operation will be described in detail below.

Preferably, the steps 630 of cutting the strip and 640 of separating the strands are performed in different moving planes, for example parallel ones. In other words, the moving plane of the strip in the cutting step 630 is different from the moving plane of the strands in the separating step 640.

This makes it possible to avoid a longitudinal propagation of the mechanical stresses generated by the separation of the strands of material. Specifically, the propagation of these stresses in the area of cutting of the strip of material could cause them to deteriorate, particularly by tearing.

The separated strands of material move until they reach the complexing device of the system, to be assembled with the electrolyte films.

1.2.2. Preparation of the Electrolyte Films

The phases 700, 800 of preparing the two electrolyte films comprise identical steps. These steps will only be described once with reference to one of the electrolyte films.

It will be understood by the person skilled in the art that the method can comprise a single phase of preparing an electrolyte film if a single electrolyte film is deposited on the separated strands of material.

The phase 700, 800 of separation of the electrolyte film comprises the steps consisting in:

moving 710 the electrolyte film, for example by unwinding the electrolyte film from a rotating reel, optionally joining 720 the beginning end of a reel of electrolyte film to the ending end of another electrolyte reel as explained previously, optionally:
  removing 730—for example by debonding, particularly using a delaminating knife comprising a debonding edge—a protective film extending over one face of the electrolyte film intended to come into contact with the strands of material, and
  redirecting the protective film off the main production path of the complex and recovering 740 the protective film—for example by winding the protective film on a reeling station, optionally, heating 750 the electrolyte film.

Each electrolyte film thus prepared then moves until it reaches the complexing device of the system to be assembled with the strands of material.

1.2.3. Complexing

A step of superimposing the electrolyte films onto the separated strands of material is then carried out in a complexing device of the system.

As illustrated in FIG. 3, each electrolyte film 14, 15 is put in contact with a respective face of the separated strands of material 12. Preferably, the width of each electrolyte film is greater than the sum of the widths of the strands of material and the distance d between these strands. Thus, each electrolyte film extends beyond the opposite edges of the separated strands of material, as shown in FIG. 1 (step 400).

Once put in contact, the electrolyte films 14, 15 and the separated strands of material 12 are complexed together to form a complex.

The complexing 900 consists in making the electrolyte films adhere to the strands of material, for example by pressing the strands of material against the electrolyte films using compressing cylinders between which the separated strands of material 12 and the electrolyte films 14, 15 move. Under the effect of the pressure generated by the compressing cylinders, the film(s) (and the electrolyte film(s) respectively), which include hot-melt polymers already melted locally owing to the heating step, adhere to the strands of material (and to the cathode film respectively) at the compression point between the cylinders.

A complex is obtained at the output of the complexing device. This complex comprises two separated strands of material interspaced between two electrolyte films.

1.2.4. Other Steps Carried Out Following Complexing.

When the electrolyte film has been heated, the method can comprise a step 1000 of cooling the complex.

The complex can comprise protective film on its outer faces, particularly when the electrolyte films comprise protective film on their faces opposite to those that have been bonded to the separated strands of material.

In this case, the method can optionally comprise a step 1010 of removal of one of the protective films of one of the complex faces. The removed protective film can then be rewound and stored 1020 for its later use, after redirection off the main path of the complex.

The method can also comprise the steps 1030 of unwinding a separating film and 1040 of superimposing the separating film on the face of the complex no longer containing any protective film (the protective film having just been removed from said face in step 1010). This separating film makes it possible to avoid the risks of bonding the turns of the complex to one another when the complex is wound to form a reel.

The separating film (which only has a separating function) is less expensive than the protective film (which has both a separating function and a function of supporting the electrolyte film).

Specifically, the protective film is for example made of polyethylene terephthalate (PET) non-stick treated on one of its faces, while the separating film is for example made of nonstick treated paper on its two faces or made of a plastic that is less expensive and non-sticking by nature, such as polyethylene (PE) or polypropylene (PP).

It can therefore be preferable to replace the protective film with the separating film to limit the costs associated with the production of the ribbon of electrical energy storage complex.

The step 1040 of superimposing the separating film on the complex can be implemented by complexing: the complex and the separating film move, for example between compressing cylinders making it possible to achieve a cowinding of the separating film on the complex. In this case, neither the complex nor the separating film is heated to avoid it resulting in a lamination that would make the subsequent separation of the film and the complex more difficult.

Once the separating film is superimposed on the complex face, the protective film covering the other face of the complex can be removed 1050 and recovered 1060 on a reeling station for its subsequent re-use, after redirection off the main production path of the complex.

The complex is then cut 1070 in the middle of the stack (as shown in FIG. 1 in step 500) to form two ribbons of electrical energy storage complex.

These ribbons are separated 1080 and reeled 1090 so as to form two reels of electrical energy storage complex ribbon.

2. Production System

There will now follow a description of some examples of systems for implementing the method for fabricating the ribbon of electrical energy storage complex.

2.1. General Principle

With reference to FIG. 4, a variant embodiment of a system for producing a ribbon of electrical energy storage complex is illustrated.

The system comprises:
- a first cutting device 20,
- a separating device 30 downstream of the first cutting device 20,
- a complexing device 40 downstream of the separating device 30, and
- a second cutting device 50 downstream of the complexing device 40.

2.1.1. Cutting Device

The first cutting device 20 cuts the strip of material 12 in two (or more than two) strands of material 12a, 12b.

This cutting device 20 comprises:
- guiding means 21 for moving the strip of material 12, and
- slicing means 22 to longitudinally cut the strip of material in order to form the strands of material.

The guiding means 21 are for example composed of two cylinders between which the strip of material 12 is pressed. Note that the guiding means are not a priori intended to drive the strands of material. The moving of the strip is caused by the driving cylinders 41, 42 also belonging to the system and located downstream of the cylinders 21, 22 described further on.

The slicing means 22 can comprise one (or more) fixed or rotating blades arranged on the travel path of the strip of material 12 so as to longitudinally cut the strip of material in order to obtain two (or a plurality of) strands of material 12a, 12b.

The second cutting device 50 makes it possible to cut the complex to obtain ribbons of electrical energy storage complex. The elements forming this second cutting device can be identical to those of the first cutting device.

2.1.2. Separating Device 2.1.2.1. General Remarks on the Separating Device

The separating device 30, illustrated in FIGS. 5 and 6, makes it possible to separate the strands of material 12a, 12b cut by the first cutting device 20.

The separating device as described in FIG. 5 comprises:
- at least one upstream guiding element 31 of the two strands of material 12a, 12b side by side,
- a spacer comprising at least two separating arms 32, 33 in parallel, each separating arm 32, 33 being positioned to guide one of the two strands of material 12a, 12b along a particular guiding direction, the guiding directions of the two separating arms being divergent, i.e. having a non-zero angle between them,
- at least one downstream guiding element 34 for the two strands of materials 12a, 12b, to guide them along a same guiding direction once they have been separated.

In the embodiment illustrated in FIG. 4, the guiding direction induced by each separating arm 32, 33 differs from the guiding direction induced by the upstream guiding element 31. In a variant, one of the separating arms can guide a strand of material along the same guiding direction as the upstream guiding element.

Preferably, as seen in FIG. 5b, the moving plane P1 wherein each strand of material 12a, 12b is found between the upstream guiding element 31 and its entry into the spacer on the one hand, and the moving plane P2 wherein each strand of material 12a, 12b is found when passing through the spacer on the other hand are not the same, and more particularly form a non-zero angle, preferably are perpendicular.

Similarly, the moving plane P2 wherein each material plane 12a, 12b is found when passing through the spacer on the one hand and the moving plane P3 where each strand of material 12a, 12b is found between leaving the spacer and the downstream guiding element 34 on the other hand are not the same, and more particularly form a non-zero angle, preferably are perpendicular.

This makes it possible to avoid the propagation of the stresses exerted by the separating arm along the strip of material, a stress propagation that could in particular generate a tear in the strip of material at the cutting device 20.

Preferably, the strands of material 12a, 12b extend in one and the same moving plane when passing through their respective separating arms.

Each separating arm comprises two successive cylinders with parallel axes. These two cylinders define, for each arm, the guiding direction of the corresponding strand of material.

Preferably, each separating arm 32, 33 comprises a stand making it easier to guarantee the parallelism of the cylinder axes, and the stability of the guiding direction.

The position of each separating arm can be adjustable so as to vary the guiding direction of each material strand 12a, 12b. This makes it possible to avoid generating undesirable mechanical stresses in the strands of material 12a, 12b, particularly when the system starts. To avoid this, it is for example possible to place the two separating arms in parallel alignment (the value of the separating distance induced by these cylinders being then zero and the axes of the cylinders then being parallel) when the system is started and progressively modify the position of each separating arm to achieve the guiding direction desired for each strand of material 12a, 12b.

Preferably, the cylinders facing the separating arms are in contact at one another at their end. This makes it possible to avoid the strands of material being damaged on their central edge (corresponding to the cutting area of the strip of material). To do this, elastic means are interposed between the arm and the adjacent cylinder bearing (located in the vicinity of one end) of at least one of the cylinders to repel the cylinder toward the adjacent cylinder connected to the other arm.

2.1.2.2. Examples of Separating Devices

The embodiments represented in FIGS. 5 and 6 will now be represented.

In the two embodiments, the upstream guiding means 31 make it possible to receive strands of material cut by the cutting device 20. These means comprise a moving cylinder, the width of which is greater than or equal to the strip of material.

Also in these two embodiments, the downstream guiding means 34 make it possible to move the strands of material 12a, 12b spaced apart by the spacer in one and the same moving plane, and preferably in a synchronized manner, reestablishing the parallelism of the strands 12a and 12b.

These means 34 also make it possible to keep constant the distance "d" between the adjacent strands of material spaced apart by the spacer.

They comprise a moving cylinder. The dimensions of this moving cylinder are preferably suitable for receiving the strands of material spaced apart by the spacer. More precisely, the length of the moving cylinder is greater than or equal to the sum of the widths of the separated strands of material and the distance d between these strands.

Note that the downstream guiding means could also comprise several cylinders with parallel axes of revolution.

The Spacer

The spacer makes it possible to space the strands of material 12a, 12b; 12a, 12b+12c, 12d along a transverse direction v extending in the moving plane of the strands of material, basically perpendicularly to the moving direction of said strands of material.

The spacer comprises a support part in contact with at least one of the strands of material, two strands of material being intended to be separated being placed on two separate support parts.

The spacer in FIG. 5 more particularly comprise two adjacent support parts, each support part comprising separating guiding means to guide each strand of material 12a, 12b respectively.

The support part makes it possible to hold the strands of material 12a, 12b in a moving plane, each strand of material being guided along its respective moving direction. The respective moving directions of the strands of material in the spacer are different from the main moving direction.

With reference to FIG. 5a, each support part comprises an arm forming a stand and bearing two successive separating guiding cylinders 32a, 32b; 33a, 33b located in one another's extension and with parallel axes. Note that at least one of the arms of the support part, particularly the two arms, are rotationally movable about an axis normal to the moving plane of the strands in the spacer. This makes it possible to ensure the correct mechanical properties of the film when the machine starts (specifically, the arms are separated gradually to divert the film gradually).

The axis of rotation of each of the arms is perpendicular to the moving plane of the strands of material and is preferably concurrent with the middle of the width of the strand of material in the vicinity of the point where it passes onto the first cylinder associated with said arm, when this cylinder is in the parallel alignment position. In this way, the stretching of a part of the strand due to torsion stresses is avoided and the risks of tearing the strand are limited.

Each separating guiding cylinder such as 32a mounted on one arm faces a guiding cylinder such as 33a mounted on the other arm so that they are adjacent, particularly so that their ends are in contact. The axes of rotation of these cylinders facing one another are concurrent and contained in a plan parallel to the moving plane of the strands of material. They form an angle α of 180° upon starting, when they are in parallel alignment (no separation) which then gradually decreases in a separation situation. The angle used in the application is approximately 179° but could be less than this value.

Each of the cylinders is of course rotationally movable about its axis and guides the strands respectively in two different and diverging guiding directions.

The adjacent separating cylinders 32a, 33a are in contact by way of one of their ends to avoid deterioration of the strands of material at their central edge, as previously indicated.

As illustrated in FIG. 6, the bearing part can comprise more than two support parts 32, 33, 35. In this embodiment, the bearing part comprises three support parts 32, 33, 35 so as to space three strands of material 12a, 12b+12c, 12d apart from one another. The axes of rotation of the separating guiding cylinders built respectively on each support part form a non-zero angle between them. More precisely, the axis of rotation of a first separating cylinder 35a located on a first support part 35 extends parallel to the axis of rotation of the upstream cylinder 31 while the axes of rotation of the two other adjacent separating guiding cylinders 32a, 33a form a non-zero angle with the axis of rotation of the first cylinder 35a. The directions of the axes of the two other cylinders 32a, 33a also form a non-zero angle between them.

The number of cylinders carried by each support part in the embodiment of FIG. 6 is also different from that in FIG. 5. Each support part 32, 33, 35 specifically comprises three separating guiding cylinders with parallel axes. Note also that the strands of material can pass over the cylinders of the spacer or under at least some of these, as can be seen in FIG. 6.

In the two embodiments represented, the upstream 31 and downstream 34 guiding means are located at the same level (or at the same height) but it is possible for this not to be the case. It could for example be possible that the upstream and downstream guiding means to be each located on a separate side of the spacer.

As indicated previously, the cylinders 32a, 33a or 32a, 33a, 35a are in contact at one of their ends. This makes it possible to avoid the strands of material being damaged. It is also desirable that the cylinders 32b, 33b represented in FIG. 5a be in contact at one of their ends but, since the device is configured to be at variable inclination, this cannot be achieved easily. Elastic means, particularly a compressed spring 36, 37 interposed between the arm and the bearing of the cylinder and repelling the cylinder toward the opposite cylinder connected to the other arm, are therefore arranged on a spindle holding the cylinder.

2.1.3. Complexing Device

The complexing device makes it possible to assembly the electrolyte films with the strands of material spaced by the separating device.

The complexing device receives as input:
the two separated strands of material 12a, 12b output by the separating device,
a first electrolyte film 14 intended to be placed on the separated strands of material 12a, 12b,
a second electrolyte film 15 intended to be placed under the separated strands of material 12a, 12b.

The complexing device makes it possible to laminate the electrolyte films and the strands of material under pressure so as to obtain a complex, the layers of which adhere together.

As illustrated in FIG. 4, the complexing device comprises pressing means for the superimposition and assembly of the electrolyte films on each of the faces of the spaced strands of material.

The pressing means for example comprise a support 41 and a compressing cylinder 42 between which electrolyte films 14, 15 and the spaced strands of material 12a, 12b move. The support can itself be composed of one (or more) support cylinders.

In this case and as illustrated in FIGS. 3 and 4, the complexing is carried out by two cylinders 41, 42 rotationally movable about their axes and superimposed, between which the electrolyte films 14, 15 and the separated strands of material 12a, 12b move, an electrolyte film passing over each of the cylinders.

The cylinders 41, 42 also form means for driving the strip of material and the strands from it into the system. At least one of the cylinders is hence connected to a motor. It is also possible to use double driving by motorizing the cylinders 41 and 42.

Advantageously one of the cylinders of the complexing device (for example the compressing cylinder) can be coupled to balancing means 43.

As illustrated in FIG. 7, these balancing means make it possible to apply different forces F1, F2 on the two ends 42a, 42b of the cylinder 42. This makes it possible to create a torque capable of slightly inclining the axis of rotation of the cylinder. Thus, the space between the two cylinders can be narrower at a first end of the cylinder (where a first strand of material is circulating) than at the second end (where a second strand is circulating).

As the cylinder jacket is made of rubber, it still allows the film to pass through but is deformed, thus modifying the drive radius of one strand in relation to the other.

This means that the path of the strands of material, as well as their linear speeds, differ. It is thus possible to vary the tension of one strand of material in relation to another strand of material.

Advantageously, the balancing means can be controlled according to data sent by a device 44 for measuring the tension of the strands of material.

This makes it possible to adjust the traction forces exerted on the strands of material to equalize them in order to avoid defects (creases, crimps) in the complex once it has been formed by the complexing device.

2.2. System for the Implementation of the Method Illustrated in FIG. 2

With reference to FIG. 8, an example is illustrated of a system for producing a ribbon for the implementation of the method illustrated in FIG. 2.

The system comprises reel stands 61 to 66 on which cathode and electrolyte reels 71 to 76 are placed.

Note that in FIG. 8 the system comprises two reel stands 63, 64 on which two reels of strips of collector/cathode material 73, 74 are placed. The system comprises two times two reel stands 61, 62 and 65, 66 on which the electrolyte films and protective film 71, 72 and 75, 76 are placed.

Two of the reel stands 61, 62 concerning the electrolyte make it possible to deposit an electrolyte film 71, 72 on a first face of the strip of material 73, 74, and two others 65, 66 make it possible to deposit an electrolyte film 75, 76 on a second face of the strip of material 73, 74.

The system could however comprise a single reel of each of the films or only one or two reels to deposit an electrolyte film on a single face of the strip of material. The strip of material 73, 74 could also comprise only one layer of cathode material, or a single layer of cathode and a collector, and it is possible for the electrolyte film not to be recovered by one or more protective film(s).

The system also comprises, for the reels carrying films/strips of the same nature, an end-to-end joining device 77, 78, 79 of conventional type making it possible to attach to an end strip of one of the reels the beginning of the other of the reels.

This end-to-end joining device is optional but could change the reels in an optimized time.

The system then comprises many tensioning devices to add tension to the various films/strips reeled from the reels. These devices are conventional and will not be further described here.

The system can also comprise an optional device (not represented) for preheating the strip of material arranged at the output of the material strip reels 73, 74. Such a preheating device can for example include heating cylinders between which the strands of material must pass.

The system also comprises a device 81 for cutting the strip of material as described previously.

The system can also comprise an alignment device (not represented) upstream of the cutting device 81 to make sure that the cutting is carried out in the middle of the width of the strip of material. This aligning device can be adjustable using a measuring element and makes it possible to align the strip of material on a reference position. It is a device of known type that will not be further detailed here.

The system also comprises the separating device 82 described previously, downstream of the cutting device.

This separating device comprises:
- an upstream guiding cylinder 83 over which the two strands of material cut side by side pass,
- two arms located in a horizontal plane, each carrying two parallel cylinders 84; pivoting means are coupled to each of the arms to make it possible to modify the position of the cylinders of each arm (spacer),
- a second downstream guiding cylinder 85 over which the two cut strands of material pass, once they have been separated; the guiding direction of this cylinder is basically parallel to that of the first guiding cylinder 83 so that the two strands of films end up being driven in parallel again.

The system also comprises a device 86 for measuring downstream of the separating device 82. This measuring device 86 makes it possible to measure the traction forces exerted respectively on each of the two strands of material exiting the separating device.

All the elements described above are placed in series, downstream of one another in their order of description and concern the strip of material.

Where the electrolyte film is concerned, the system comprises a device 91 for removing a protective film extending over the face of the electrolyte film intended to come into contact with the strands of material.

After passing through the removal station 91, the protective film is diverted and rewound on a recovery reel 92. It can then be re-used on another electrolyte film.

The electrolyte film separated from the protective film then passes through the heating cylinders 93, so that the electrolyte film adheres better to the strands of material.

The system also comprises a complexing device 94 as described previously, into which the two strands of material enter, a first electrolyte film intended to be placed on the strands of material, and a second electrolyte film intended to be placed under the strands of material.

A complex is obtained at the output of the complexing device.

The system can comprise conventional cooling cylinders downstream of the complexing device, comprising one or more cold cylinders over which the complex is passed.

It also comprises two removal devices 96 making it possible to remove the protective film remaining on either side of the complex. The protective films are then diverted toward the winders 97 making it possible to rewind them and recover them to re-use them subsequently.

Advantageously, the system can also comprise a device 98 for putting the separating film on the complex by complexing. This separating film avoids the complex becoming bonded to itself when it is wound on a reel. This device 98 can particularly comprise two single cylinders between which the complex and the separating film move.

The system also comprises a cutting device 99 such as that described previously, and which makes it possible to cut the double-width complex longitudinally at its center (where the superimposition does not include any strand of material, in the separation space between the two strands). As before, this cutting device can be combined with an alignment device for aligning with respect to a reference position so that the cutting is done in an area desired by the user.

The assembly device then comprises guiding cylinders 101 to divert the two single-width complex ribbons obtained following the cutting.

One of the single-width complex ribbons is driven in a first path toward a first reel 102 on which it is rewound while the other complex ribbon is driven in a second path, toward a second reel 103 on which it is rewound.

The complexing device can also include means for displaying the state of the finished film and means for signaling a defect if the state displaying means have detected such a defect.

Such displaying means can include a video camera while the signaling means comprise a label applying device, such a device being able to apply a label at the beginning of the area comprising the defect and a label at the end of the area. Such a device can also or alternatively comprise the inputting of information into an RFID chip or the emission of an ink jet to signal a defect.

The system and the method described above thus make it possible to produce a ribbon of electrical energy storage complex of desired width from films of greater width, automatically, while limiting the amount of human involvement necessary, which reduces the fabrication cost of such a ribbon and increases the production rate.

3. Alternatives

The reader will understand that many modifications can be made to the method and system described above without materially departing from the new teachings described here.

As a consequence, all modifications of this type are intended to be included within the scope of the attached claims.

The invention claimed is:

1. A device for separating at least two strands of material created by longitudinally cutting a continuously moving strip of material, wherein the device comprises:
   upstream guiding means of the two strands of material, guiding them along one and the same direction, known as the main direction,
   a spacer to space the strands of material along a direction extending in the moving plane of the strands of material, the spacer including guiding means configured to guide the strands of material along two separate and divergent directions,
   downstream guiding means of the two separated strands of material, guiding them along one and the same direction,
   the upstream guiding means and the spacer being positioned so that the moving plane of the strands of material in the spacer forms a nonzero angle with the moving plane of the strands of material between the upstream guiding means and the spacer,
   the spacer and the downstream guiding means being positioned so that the moving plane of the strands of material in the spacer forms a non-zero angle with the moving plane of the strands of material between the spacer and the downstream guiding means,
   wherein the spacer comprises at least two adjacent support parts, each support part including at least two successive guiding cylinders with parallel axes rotationally movable about their axes, to separately guide one of the strands of material;
   the axes of rotation of the two guiding cylinders belonging to two separate support parts forming a non-zero angle between them;
   wherein at least two adjacent guiding cylinders belonging to separate support parts are in contact at one of their ends.

2. The device according to claim 1, wherein each of the support parts comprises an arm connecting the successive guiding cylinders of the support part together and keeping their axes mutually parallel, at least one of the arms being able to pivot in relation to the other of the arms along a direction basically normal to the moving plane of the strands of material.

3. The device according to claim 1, wherein pre-stressed elastic means are located between one of the ends of the guiding cylinder and the arm carrying this cylinder to repel said cylinder toward the adjacent guiding cylinder belonging to another support part.

4. The device according to claim 1, wherein the downstream guiding means comprise at least one moving cylinder rotationally movable about its axis, the cylinder(s) being suitable for receiving the strands of material spaced apart by the spacer.

5. The device according to claim 1, wherein the upstream guiding means comprise at least one moving cylinder rotationally movable about its axis, suitable for receiving the strands of material cut longitudinally and located side by side.

6. The device according to claim 1, wherein:
   the upstream guiding means and the spacer are positioned so that the moving plane of the strands of material in the spacer is basically perpendicular to the moving plane of the strands of material between the upstream guiding means and the spacer, and/or
   the spacer and the downstream guiding means are positioned so that the moving plane of the strands of material in the spacer is basically perpendicular to the moving plane of the strands of material between the spacer and the downstream guiding means.

7. The device according to claim 1, wherein the downstream guiding means are configured to guide the strands of material along the main direction, the guiding means of the spacer being configured to guide at least one of the strands of material, particularly the two strands, along a direction separate from the main direction.

8. A system for producing a ribbon of electrical energy storage complex including at least one strand of material, wherein the production system includes a separating device according to claim 1 to space at least two strands of material apart from one another.

9. The system according to claim 8, which further comprises a measuring device, downstream of the separating device, to measure the traction forces exerted on each strand of material.

10. The system according to claim 8, which further comprises a complexing device, downstream of the separating device, to assemble at least one film in a single piece, such as an electrolyte film, on the spaced strands of material.

11. The system according to claim 10, wherein the complexing device comprises pressing means for superimposing and assembling said or at least one of the films on one of the faces of the spaced strands of material.

12. The system according to claim 11, wherein the pressing means comprise a support and a compressing cylinder, the spaced strands of material and the film(s) moving between the support and said compressing cylinder.

13. The system according to claim 12, wherein the support comprises at least one support cylinder facing said and at least one compressing cylinder.

14. The system according to claim 13, wherein the pressing means varies the inclination of the axis of rotation of the compressing cylinder in relation to the support, as a function of the results returned by the measuring device.

15. The system according to claim 8, which further comprises a heating element for heating the strands of material and/or said or at least one of the films superimposed on the strands of material.

* * * * *